June 17, 1941. H. S. CAMPBELL 2,245,754
MANUAL STARTER FOR AIRCRAFT ENGINES
Filed May 10, 1938 3 Sheets-Sheet 2

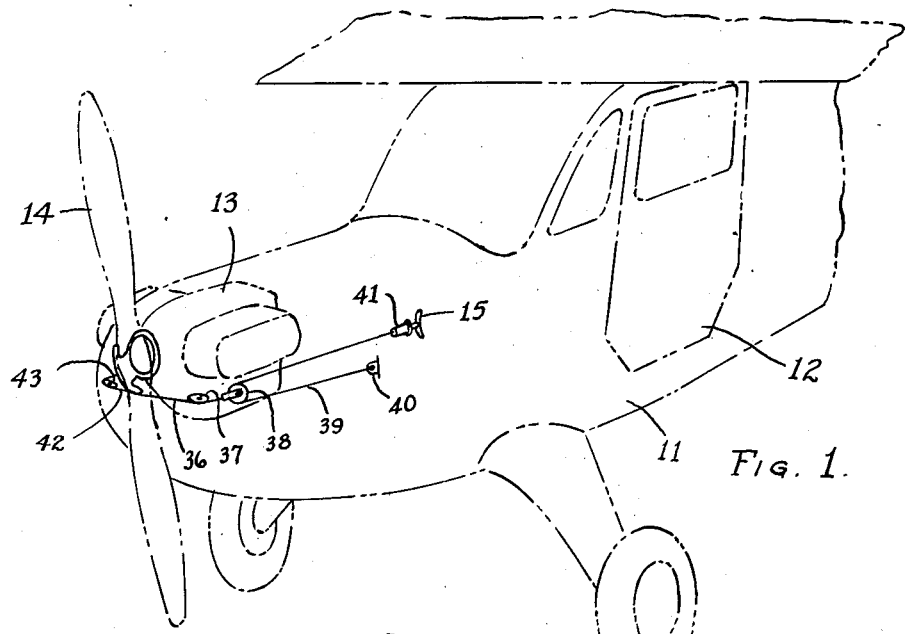
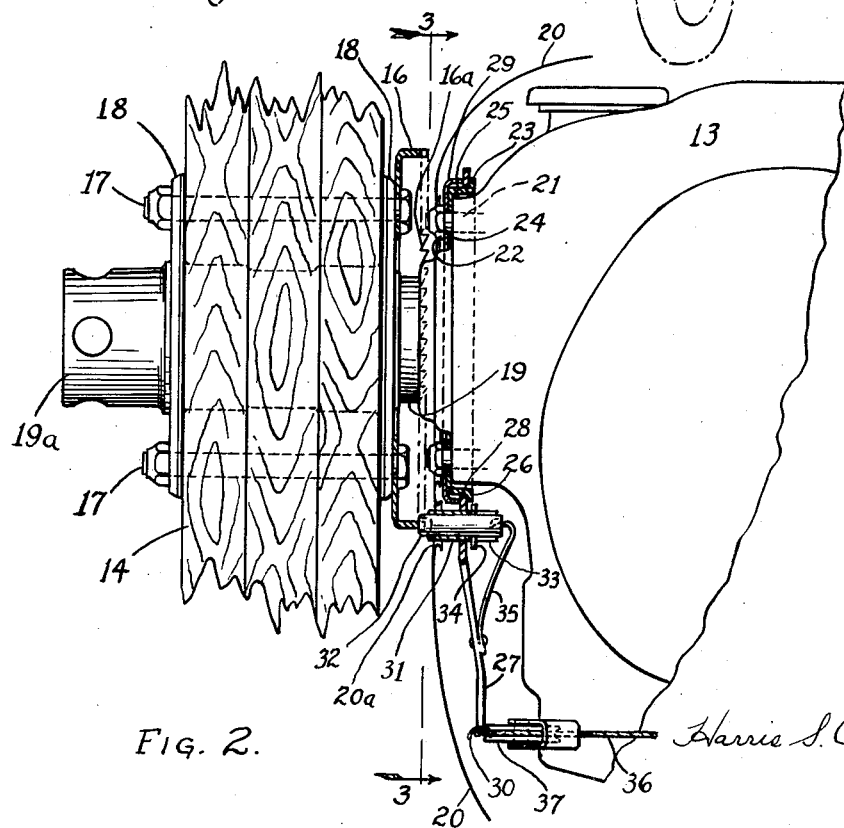

Inventor
Harris S. Campbell

Inventor
Harris S. Campbell

Patented June 17, 1941

2,245,754

UNITED STATES PATENT OFFICE 2,245,754

MANUAL STARTER FOR AIRCRAFT ENGINES

Harris S. Campbell, Bryn Athyn, Pa.

Application May 10, 1938, Serial No. 207,005

8 Claims. (Cl. 185—41)

This invention relates to starting devices for internal combustion engines and is particularly concerned with the mechanism which enables the engine to be readily rotated manually for starting purposes.

The apparatus of the present invention is particularly adapted for use on aircraft engines where a light and compact starting unit is essential.

In many aircraft engines starters have been omitted in order to save weight so that it has been necessary to start the engine by turning the propeller by hand. Starting in this manner usually requires two persons in order that the operator may be in position to control the throttle and other engine controls at the time an assistant is turning the engine by means of the propeller.

Aircraft of the larger type having more powerful engines are generally equipped with power driven engine starting units enabling the operator to start the engine while seated in the aircraft. These power driven units entail apparatus of considerable weight. For example, the electric type starter requires an electric motor with a system of reduction gears as well as a heavy storage battery. While the addition of this weight to a large sized aircraft can be justified, the penalty for light aircraft having low powered engines is too great to permit the use of engine starters of this type.

Apparatus permitting starting of light aircraft engines from the operator's compartment is highly desirable however. Starting an engine by turning the propeller is an awkward and dangerous proceeding, particularly under conditions where solid footing is not available. In the case of light aircraft mounted on floats for operation from water, starting of the engine by means of the propeller becomes increasingly difficult.

It is the purpose of the present invention to provide a light weight manual starting unit which will permit the operator to start the engine while remaining in the normal operating position in the aircraft.

It is a further object of the invention to provide a starting device of this nature which is compact, low in weight and readily adaptable for use with different types of engine.

In a manual starting device for an engine the most convenient and effective method of generating the forces necessary to supply the torque to the engine is by the use of a pull-cord arrangement. By means of the pull-cord the operator is able to apply greater force in a short interval of time without undue effort as compared to other manual devices such as a rotary crank.

It is an object of the present invention to provide a pull-cord type of starter incorporating the mechanical advantage necessary for use on engines of considerable power. In aircraft engines particularly it is desirable that at least one quarter of a revolution of the crank shaft be made at sufficient speed to obtain satisfactory operation of the ignition system. The reduction ratio of the starter of the present invention is arranged to provide an adequate amount and speed of rotation to enable the engine to be started with a minimum of effort.

It is an object of this invention to incorporate a means which will permit the engine to overrun the starting device when the engine starts and to automatically disengage the starter from the engine upon starting.

In power type starting devices usually a considerable amount of angular movement is required in the starting unit in order to cause it to engage the engine element for the purpose of applying torque thereto. In a starter of the pull type, rotation of the starter unit for engagement purposes must be kept to a minimum, since any rotation which occurs prior to engagement uses up part of the pull stroke and therefore reduces the amount of effective stroke for actual starting. Since the total stroke available is generally not greater than about 24 inches it will be evident that it is desirable to utilize practically all of the distance available in applying rotational movement to the engine crank shaft.

It is an object of the present invention to provide engaging mechanism for a manual starter of the pull-cord type that will result in a minimum of lost motion for engagement of the starter device with the engine.

Another object of the present invention is to provide a manual starting device in which a torque limiting element is incorporated to protect the mechanism and the operator in case of overloads in the starting device, such as may occur during a backfire of the engine.

In most small engines for use in light planes the accessory casing is not large enough to accommodate extra accessories, the space being generally taken up by such units as the magnetos, an oil pump, and a tachometer connector, etc.

It is a further object of the invention to provide a starting device which may be adapted for attachment to any engine without the need for special mounting provisions being designed into the engine. This is accomplished in the present invention by using an existing shaft outlet, such as the propeller shaft, to transmit the starting torque to the engine.

Another specific object is to provide a starting unit which may be applied to engines in existing aircraft in a minimum amount of time at low cost and with little change to existing parts of the aircraft.

How the foregoing and other objects incident to the invention are accomplished will be evident from the description of the drawings in which Figure 1 is a perspective view of part of an aircraft showing the general arrangement of a starter installation in accordance with the present invention.

Figure 2 is a side elevation with certain parts in section showing the starter unit in relation to parts of the aircraft.

Figure 3:
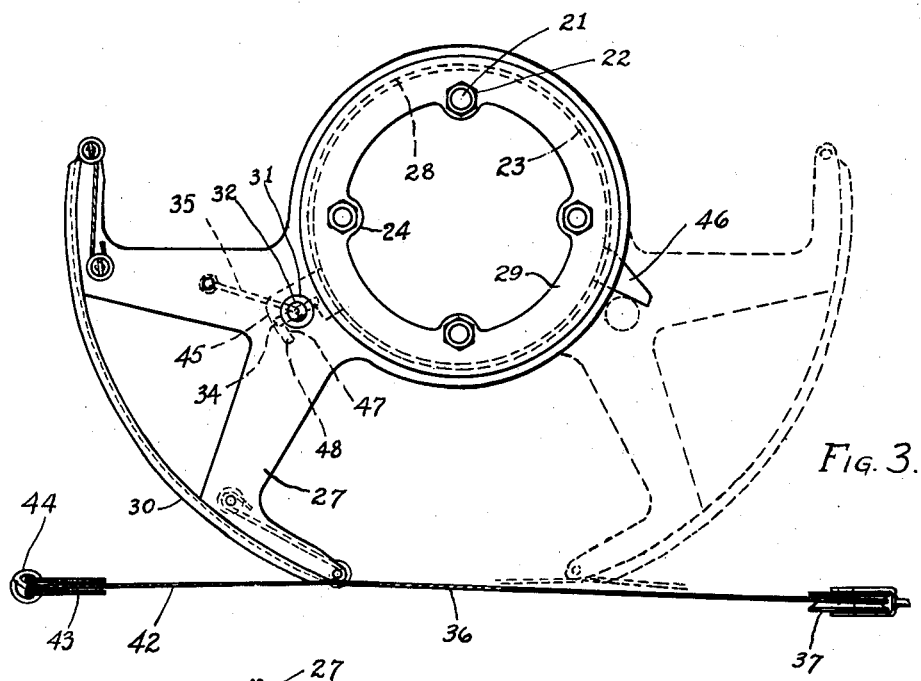
Figure 3 is a view taken generally in the direction of the arrows 3—3 on Figure 2, showing the mounting for the cable attaching part, engine and cowling parts being omitted.

In Figure 1 a portion of an aircraft is shown in chain dotted outline having a body or fuselage 11 containing an occupant's compartment into which door 12 opens. At the front end of the fuselage 11 is an engine 13 which drives propeller 14.

The engine starting mechanism shown in Figure 1 is mounted at the front end of the fuselage 11 in front of the engine 13. Control members for the starter mechanism extend from the starter parts proper back to the occupant's compartment where there is a handle 15 mounted within easy reach of the operator.

The details of the starter mechanism are disclosed more clearly in Figures 2, 3, 4 and 5.

In Figure 2 it will be seen that a ratchet part 16 is connected to the rear face of the propeller 14 by means of the bolts 17 which fasten the propeller 14 to the flange plates 18. These plates retain the propeller in place and transmit the power delivered from the engine 13 by means of the propeller shaft 19. A nut 19a retains the propeller unit in place on the shaft 19. The engine cowling 20 encloses part of the engine 13.

In the nose portion of the engine 13 are studs 21 with nuts 22 which retain a cover plate and thrust bearing in position in the engine casing. In the particular starting mechanism shown in Figure 2, the studs 21 and nuts 22 are utilized to fasten certain parts of the starter mechanism to the engine. A specially shaped bearing member 23 has inwardly directed ears 24 adapted to fit over studs 21, a cylindrical portion 25 and an outwardly directed flange 26. The plate member 27 having a circular opening 28 is adapted to fit the cylindrical portion 25 of member 23 for rotation thereon. A retaining member 29 maintains the plate member 27 in position against the flange 26 of part 23 and this assembly is retained in place on the engine by studs 21 and nuts 22. Proper clearances are, of course, provided to permit easy rotation of part 27 with respect to the retaining and bearing parts 23 and 29.

Reference to Figures 2 and 3 will disclose that plate part 27 forms a portion of a cable pulley having a cable groove 30 at its outer edge. In the example shown, the cable groove 30 (see Figure 3) extends over a portion of a circle slightly greater than 90° in length. Attached to the plate or pulley member 27 at a point just outside the supporting bearing parts 23 and 29 is cylindrical shaped part 31 in which a latch 32 is fitted. Slots 33 in cylindrical part 31 are provided to permit a small pin 34 to be inserted in the cylindrical latch part 32 and project beyond through the slots 33 outside the cylindrical retaining part 31. Pin 34 retains latch part 32 in correct position to register with the teeth 16a of the ratchet member 16 and also is used in withdrawing the latch from the ratchet teeth in a fashion to be described later. A light cantilever type spring 35 is provided to urge the latch member 32 to its extended position.

The pulley member 27 is rotated by means of cable 36 which extends over pulley 37 to floating pulley 38 shown in Figure 1. Another cable 39 passes over pulley 38, one end being anchored as at 40 to a convenient point on the aircraft and the other end of cable 39 being attached to the handle 15 which is actuated by the operator. Handle 15 may be conveniently supported when in unused position by a cylindrical bracket member 41 attached to the aircraft structure at a point selected for mounting handle 15. A return cable 42 is also attached to the pulley member 30 and passes around a pulley 43 to spring 44 by means of which the cable pulley part 27 is returned to disengaged position after having been moved by the operator. This system of cables with the floating pulley provides for an increased mechanical advantage in a simple and convenient fashion which allows the starter parts which are mounted on the nose of the engine to be kept small and compact. At the same time the load required to be applied by the operator for actuation of the starter is low.

The range of movement provided for the starter part 27 which carries the latch 32 is governed by suitable stops 45 and 46, (see Figure 3). These stop parts 45 and 46 are attached to the supporting member 23 and are adapted to come in contact with the cylindrical latch retaining part 31 in the extreme positions of the cable pulley part 27.

The stop member 45 which fixes the off or release position of the cable pulley part 27 is arranged to perform an additional function besides that of a stop. This additional function is to withdraw the latch from its engaged position when the pulley part 27 is returned by means of spring 44 to its "off" position.

Figure 4:
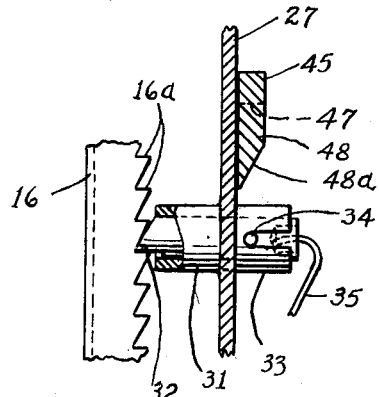
Figure 4 is a detail of the engaging mechanism to an enlarged scale.
Figure 5:
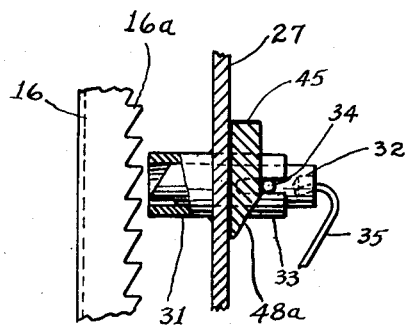
Figure 5 is a view of the same parts as in Figure 4 showing the mechanism in disengaged position.

Figures 4 and 5 illustrate clearly how the stop part 45 withdraws the latch 32 to disengaged position. In Figure 4 the latch and stop parts are shown in a position where they are slightly separated. In this position the latch spring 35 causes the latch 32 to project beyond its cylindrical housing 31 to engage the ratchet teeth 16a so that it is in position for rotating the ratchet 16 when moving away from stop 45. However when the latch unit is moving toward stop 45 as when being returned by the spring 44, the latch rides over the teeth 16a due to their shape until it approaches the stop 45. Stop 45 has a slot 47 wide enough to permit entry of the latch cylinder 31. The projecting ears 48 formed on each side of slot 47 have a bevel or slope 48a, lower portion of 48a being adapted to project under the pin 34 and as the latch cylinder 31 moves into the slot 48, the latch part 32 is withdrawn from the ratchet teeth 16a and maintained in disengaged position as shown in Figure 5 at all times when the starter parts are in off position.

Operation of the starter will then be as follows. When it is desired to start the engine the operator will pull on handle 15 which moves the cable pulley part 27 and during the first portion of the movement (which is a very small part of the total movement) the latch becomes engaged with the ratchet teeth 16a immediately upon moving away from stop 45. Upon engagement with ratchet teeth 16a the propeller is rotated and since it is connected to the engine shaft 19 the engine is turned over at the same time. The arrangement of the ratchet provides, of course, for rotation of the engine in its running direction. When ignition and gas are turned on the engine will start in the same manner as it would if the propeller were turned over by hand.

It should be noted that the starter arrangement as shown provides for approximately the same amount of rotation of the engine as can be obtained with manual starting by pulling directly on the propeller. In case the engine does not start upon the first pull of handle 16, the operator returns the handle to its original position which permits the spring 44 to return the cable pulley member 27 to its "off" position, the latch 32 moving back over the ratchet 16a without appreciable resistance in this direction of movement. The starter handle 15 can then be given another pull and when the engine starts, rotation of ratchet part 16 causes disengagement of the latch 32 and permits it to slide over ratchet teeth 16a. The operator then releases handle 15 to allow it to return to its disengaged position and the cable pulley part 27 returns to its "off" position under the influence of spring 44. During this return the latch 32 slides over ratchet teeth 16a. The lightness of the pressure from spring 35 prevents any damage occurring to the latch or ratchet parts during the return movement, even with engine running. It is desirable, of course, to provide the latch part 32 with a hardened tip so that undue wear does not occur. Upon return to stop 45 the latch is automatically disengaged from the ratchet teeth and remains in this position during operation of the engine and until the next starting operation is required.

In Figure 3 the cable pulley part 27 is shown by dotted lines in the extreme position at the end of a pull.

It will be noted in Figure 2 that the starter mechanism is in large part enclosed by engine cowling 20. The ratchet part 16 which is fastened to the back face of the propeller 14, although outside the cowling 20, is substantially the same diameter as the hub of the propeller and therefore is not noticeable. The latch 32 projects through a small arc-shaped slot 20a in the cowling, this slot being of sufficient length to accommodate the movement of the latch between its extreme positions. This arrangement, therefore, in no way detracts from the appearance of the aircraft and this general scheme is readily adaptable for application to existing aircraft designs, requiring only such minor alterations as making the slot 20a.

The ratchet part 16 is of fairly large diameter as compared to the diameter of engine shaft 19. This permits the use of a large number of ratchet teeth such as indicated in the present example, there being seventy-two teeth resulting in only five degrees angular distance between one tooth and the next. Also since the depth of the teeth is small, the angular motion required to cause disengagement of the latch 32 by means of the bevelled ears 48 is a minimum requiring not more than five degrees movement. With this arrangement, therefore, engagement of the latch for rotational purposes is accomplished in a space slightly more than five degrees. In the case where the total angular movement in one pull is 120 degrees, the lost motion for engagement will usually be around seven percent of the total movement. This amount of movement is a matter of less than two inches at the handle. It will be evident therefore that a ratchet device of this general type provides a simple and practical starting mechanism.

At times it is desirable to rotate the engine in reverse direction by hand with the ignition off. The arrangement of starter parts described above readily permits this to be done since in disengaged position the latch 32 is completely disconnected from the ratchet part 16 and in no way interferes with movement of the propeller as desired.

Also in certain instances during starting, a backfire may occur under which circumstances the starter parts are carried around until they reach "off" position where the latch is disengaged from the ratchet so that no damage occurs to the starter nor operator. In this event sometimes the starter handle may be pulled from the operator's hand.

Figure 6:
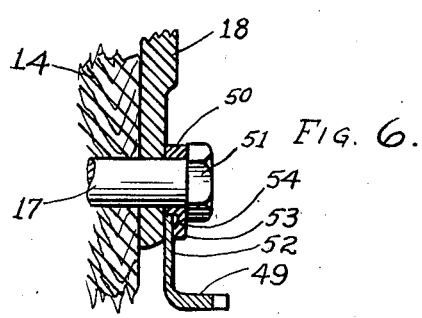
Figure 6 is a sectional view showing an alternative arrangement for attaching one of the starter elements.

In some engines and under some conditions it is desirable to provide a torque limiting arrangement to protect the starter parts and operator from the effect of overloads such as may occur from a backfire or faulty engine operation during starting. Figure 6 shows an alternative arrangement for attaching the ratchet member 49 to the propeller. Propeller mounting bolts 17 are used to retain an annular shaped member 50 which includes holes 51 to register with bolts 17. The outer portion of annular member 50 is shaped to permit the internal flange 52 of ratchet part 49 to be clamped in place between the propeller flange 18 and the lip 53 formed on member 50. By means of undercut 54 a certain degree of flexibility may be given to the lip 53 so that when clamped down against the flange 52 it provides a spring action. Thus in case of torque overload ratchet member 49 may slip with respect to flange 18 and retaining member 50 since the drive between these members and flange 52 of the ratchet member 49 is dependent on frictional contact. By proper adjustment of these parts they can be made to transmit torque sufficient to start the engine, but slippage will occur upon loads which exceed appreciably this maximum starting torque.

Figures 7, 8:
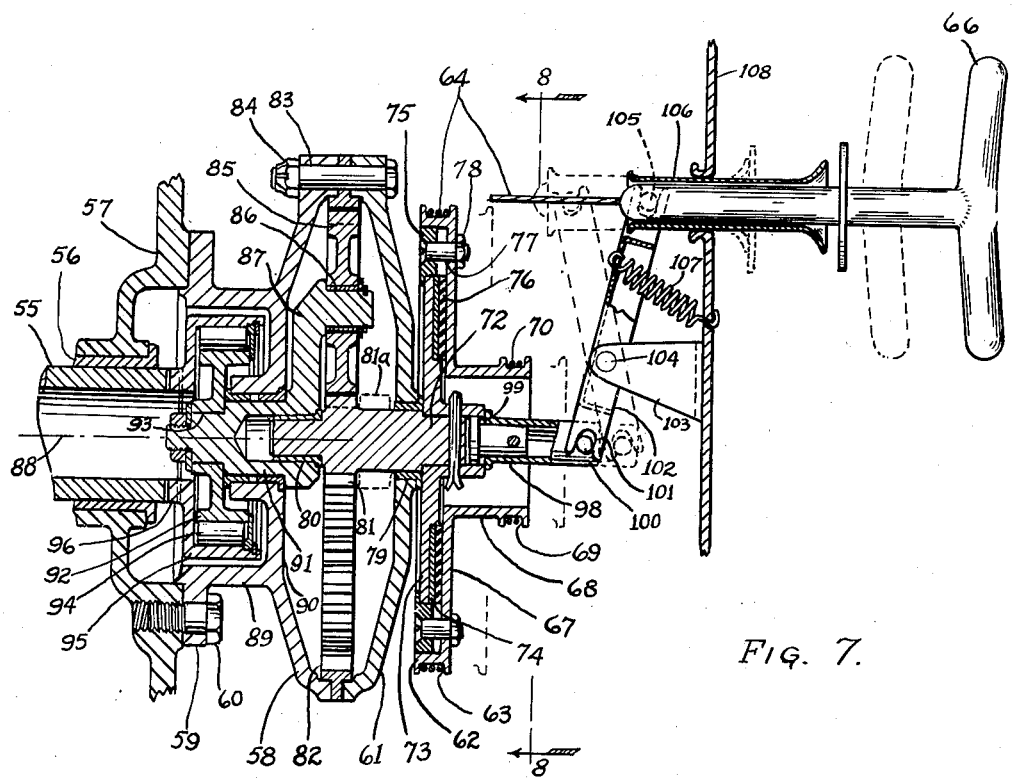
Figure 7 is a side view partly in section of another form of the starting apparatus of the present invention.
Figure 8 is a view of the starter unit taken on the line 8—8, Figure 7.

In Figures 7 and 8 a somewhat different arrangement of starting unit is shown. This unit is arranged for connection to an engine shaft such as at the end of the crankshaft remote from the propeller. In this arrangement the end of a crankshaft is shown at 55 supported in a bearing 56 mounted in engine casing 57. An engine starter unit having parts enclosed in casing 58 is adapted to be attached to the engine casing 57 by means of flange 59 and bolts 60. A cover plate 61 forms another portion of the starter unit casing outside of which is positioned a pulley drum 62 which is in the form of a complete pulley having a peripheral groove 63 adapted to carry a cable indicated at 64. One end of cable 64 is anchored to the pulley 63 in a convenient fashion, the cable then running around groove 63 and over small pulley 65 supported on cover plate 61. Cable 64 then extends to a handle 66 located within reach of the operator. The cable drum 62 is made in the form of a disc wheel, the drum being located at the outer periphery of disc 67. A cylindrical shaped hub 68 is formed to project from the disc 67 and carries a groove 69 in which is located a cable 70. One end of the cable 70 is anchored to the pulley cylinder 68, the cable then passing around in groove 69 in a direction opposite to that in which cable 64 is wound in its groove. Cable 70 is attached to a spring 71 which constitutes the return spring for the starter mechanism, being suitably anchored.

The cable pulley 62 is attached to a shaft 72 by means of a disc member 73, a friction plate 74 and a retaining plate 75. A disc 76 which may be of rubber or other resilient material is shown between the disc portion 67 of pulley part 62 and the friction disc 74 in order to provide a resilient pressure between the plates, which pressure may be adjusted to the desired proportions by means of screws 77 and nuts 78 which react between plate 75 and disc 67. In this way a connection is made between actuating pulley 62 and shaft 72 which will provide a slipping connection upon torque overload.

Shaft 72 is supported for rotation of bearings 79 and 80 and carries a small gear 81. An internally toothed ring gear 82 is supported around its outside circumference by the casing 58 and the cover plate 61. Bolts 83 and nuts 84 retain these parts in assembled position. A planet gear 85 is arranged to mesh with ring gear 82 and also with gear 81. The planet gear 85 is mounted for rotation on a bearing 86 at the end of crank arm 87, which crank is journalled for rotational movement in casing 58 about an axis 88 which is concentric with the axis of rotation for shaft 72 and the axis of rotation of the engine shaft 55.

Casing 58 has a cylindrical portion 89 between the wall portion 90 and flange 59. The cylindrical portion 91 of crank 87 projects through the wall 90 into the inside of cylindrical part 89 where the end of crank part 91 is connected to an inner portion 92 of an overrunning clutch device. The squared end 93 of the crank part 91 forms a driving connection to overrunning clutch part 92. Rollers 94 and outer race 95 are used to transmit the torque. Toothed projections 96 engage corresponding slots in the end of engine shaft 55. The overrunning clutch is of the common cylindrical roller type and need not be described in detail. It is adapted to rotate the engine in the direction of arrow 97 (Figure 8) when the starter mechanism is turned in that direction. The overrunning clutch releases upon rotation of the starter in a direction contrary to arrow 97.

In order to provide for disconnection of the cable drum from the starter parts to permit reverse rotation of the engine by hand at times when it is desired to "unload" the cylinders, mechanism is provided for shifting small gear 81 along its axis out of engagement with planet gear 85. For this purpose, a small push rod 98 is mounted to engage an annular lip 99 on disc part 73 in a fashion to permit relative rotation between push rod 98 and lip 99, while at the same time providing for thrust reaction therebetween. A pivot 100 at the end of push rod 98 engages slot 101 at the end of lever 102, which is pivoted to bracket 103 by pivot 104. The other end of lever 102 is pivoted at 105 to tubular member 106 which forms the housing for the cable handle 66 when it is in released position. A tension spring 107 reacts between lever 102 and wall 108.

In the position shown in full lines in Figure 7 the handle 66 has been pulled out a short distance thereby permitting spring 107 to move lever 102 into position to engage gear 81 with gear 85 in which position the starter is ready for operation and any additional pull on handle 66 causes rotation of the crank 87 and thereby rotates the engine shaft 55 through the gearing and overrunning clutch. It will be noted that only a very small movement of the handle 66 is required to cause engagement of the gear 81 to operative position so that a very small percentage of the total pull distance is lost for engagement purposes. It should also be noted that the overrunning clutch shown has substantially no lost motion.

With this arrangement of gearing it is possible to obtain in very compact form the correct reduction to provide the proper mechanical advantage between the pull handle 66 and the engine shaft 55 to give easy operation and at the same time permit sufficient rotation for the engine to be readily started. Release of the starter handle allows the return spring 71 to rotate the pulley drum 62 to withdraw the starter handle to the position shown in dotted outline. At the same time the other parts of the starter are rotated in reverse direction, but this rotation is not transmitted to the engine shaft because of operation of the overrunning clutch. The overrunning clutch also operates immediately upon starting of the engine to permit smooth overrunning of the engine with respect to the starter unit. When the handle 66 is returned to dotted line position it causes the tubular member 106 to move forwardly, since the main return spring 71 overcomes the smaller spring 107, thereby causing disengagement of the gear 81 to dotted line position 81a.

It will be seen, therefore, that this form of starter functions in substantially the same manner as the form indicated in Figures 1 to 6. Manual starters of these types are compact and light in weight and are easily installed in aircraft. Since they are made up of parts which form essentially separate units from the engine, they can be adapted for installation on different types of engines. In pull type starters in accordance with the present invention, a minimum amount of pull movement is wasted in engaging the starter parts for operation, yet the engaging mechanism is kept simple in construction and permits complete separation of the actuating mechanism from the engine at all times when the starter is not being used. The torque limiting features of starters of the type shown produces a valuable protection for the starting mechanism and operator.

I claim:

1. For an aircraft engine, a manual starting device having a ratchet part connected with the propeller shaft, a bearing member supported on the engine casing close to said ratchet part, a rotatable part mounted on said bearing member for rotation about an axis coincident with the axis of the propeller shaft, latch means carried by said rotatable part and adapted for engagement with said ratchet part to cause rotation in the normal direction of engine rotation, stop means attached to said bearing member for limiting the range of movement of said rotatable part, at least one of said stop means being adapted to cause disconnection of said latch means from said ratchet part, thereby providing an integral unit for attachment to the engine casing, a handle and cable means interconnecting said handle and said rotatable part.

2. A manual engine starting device for use on aircraft having a part adapted to be attached for rotation with the propeller shaft, a bearing member supported on the engine casing near said part, a rotatable element mounted on said bearing member, a handle, means interconnecting said handle and said rotatable element to cause rotation thereof, engaging means adapted to transmit rotation of said rotatable element to said part only in a direction to cause forward rotation of the engine and separate frictional torque limiting means between said rotatable element and the propeller shaft adapted to provide torque limiting regardless of the position of said rotatable element.

3. For an aircraft engine having a propeller shaft and a flange for supporting a propeller thereon, a pull type starting device having a ratchet part adapted to be connected to the propeller flange, a bearing mounting part connected to the engine casing close to said ratchet part, a sector member mounted for rotation through an angle less than 360° on said bearing mounting part, latch means carried by said sector member and adapted for engagement with said ratchet part to cause rotation in the normal direction of rotation, stop means attached to said bearing mounting part for limiting the angle of rotation of said sector member, one of said stop means being adapted to lift said latch means out of engagement with said ratchet part, said ratchet part, said bearing mounting part and said sector member being adapted for mounting between the engine casing and the propeller, and a cable attached to said sector member for operation thereof.

4. For an aircraft engine having a propeller shaft and a flange for supporting a propeller thereon, a starting device having a ratchet part adapted to be supported by the propeller flange, a bearing mounting part adapted for attachment to the engine casing close to said ratchet part, a cable attaching member mounted for rotation through an angle less than 360° on said bearing mounting part, a latch carried by said cable attaching member and adapted for engagement with said ratchet part by movement in a direction parallel to the axis of rotation of the propeller shaft, stop means attached to said bearing mounting part, one of said stop means having an inclined portion adapted to disengage said latch from said ratchet part.

5. For an aircraft engine having a propeller shaft and a flange for supporting a propeller thereon, a starting unit having a ratchet part adapted to be supported by the propeller flange, a bearing mounting part adapted for attachment to the engine casing close to said ratchet part, a cable attaching member mounted for rotation through an angle less than 360° on said bearing mounting part, a latch carried by said cable attaching member and adapted for engagement with said ratchet part by movement in a direction parallel to the axis of rotation of the propeller shaft, stop means attached to said bearing mounting part, one of said stop means having an inclined portion adapted to disengage said latch from said ratchet part, said ratchet part being supported by means of frictional engagement so that upon overload it may rotate with respect to its supporting parts.

6. A starter for an aircraft engine including a ratchet member adapted to be supported for rotation with the propeller flange, a bearing mounting part adapted for attachment to the engine casing near said ratchet part, a cable attaching element mounted for rotation on said bearing mounting part, a cylindrical member mounted on said cable attaching part and having a slot, a cylindrical latch adapted to fit said cylindrical part and having a pin adapted to fit in said slot, a stop member on said bearing mounting part having an incline to contact said pin for the purpose of withdrawing said latch from engagement with said ratchet.

7. For an aircraft engine having a propeller shaft and a flange for supporting the propeller thereon, a pull type starting device having a ratchet part adapted to be supported by the propeller flange, a bearing mounting part for attachment to the engine casing close to said ratchet part, a swinging member mounted for rotation through an angle less than 360° on said bearing mounting part, latch means carried by said swinging member and adapted for engagement with said ratchet part to cause rotation in the normal direction of rotation, stop means attached to the said bearing mounting part for limiting the angle of rotation of said swinging member, one of said stop means being adapted to lift said latch means out of engagement with said ratchet part, said ratchet part, said bearing mounting part and said swinging member being adapted for mounting between the engine casing and the propeller, and a cable attached to said swinging member for operation thereof.

8. For an aircraft engine having an engine casing with a propeller shaft projecting therefrom and a propeller mounted thereon, an engine cowling enclosing the portion of the engine casing adjacent the propeller shaft, said cowling being between the engine casing and the propeller, an engine starter device having a circular part attached to the propeller shaft adjacent the propeller and a unit attached to the engine casing, said unit having a bearing member adapted to be bolted to the said engine casing, a rotatable element mounted on said member and carrying engaging means adapted for engagement with said circular part during rotation in the normal direction of engine rotation, stop means attached to said bearing element for limiting the range of rotation of said rotatable element, at least one of said stop means being adapted to disengage said engaging means from said circular part upon contact with said stop means, actuating means for moving said rotatable element; said bearing member, said rotatable element, said stop means and said actuating means being located inside said cowling.

HARRIS S. CAMPBELL.